(12) United States Patent
Peterson et al.

(10) Patent No.: US 11,294,885 B2
(45) Date of Patent: Apr. 5, 2022

(54) TRANSACTIONAL INTEGRITY IN A SEGMENTED DATABASE ARCHITECTURE

(71) Applicant: AVEVA Software, LLC, Lake Forest, CA (US)

(72) Inventors: Murray Wayne Peterson, Calgary (CA); Sheila Yvonne Stewart, Calgary (CA); Corvil Burdett Howells, Calgary (CA); Collin Miles Roth, Vancouver (CA)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 196 days.

(21) Appl. No.: 16/672,195

(22) Filed: Nov. 1, 2019

(65) Prior Publication Data

US 2020/0065299 A1    Feb. 27, 2020

Related U.S. Application Data

(63) Continuation of application No. 15/194,038, filed on Jun. 27, 2016, now Pat. No. 11,144,532.

(51) Int. Cl.
*G06F 16/23* (2019.01)
*G06F 16/22* (2019.01)

(52) U.S. Cl.
CPC .......... *G06F 16/2365* (2019.01); *G06F 16/22* (2019.01); *G05B 2219/31422* (2013.01); *G05B 2219/33125* (2013.01)

(58) Field of Classification Search
CPC ................. G06F 16/2365; G06F 16/22; G05B 2219/31422; G05B 2219/33125

USPC ......................................................... 707/703
See application file for complete search history.

(56) References Cited

U.S. PATENT DOCUMENTS

| | | | |
|---|---|---|---|
| 6,067,477 A * | 5/2000 | Wewalaarachchi .. | G05B 19/418 700/83 |
| 6,182,249 B1 * | 1/2001 | Wookey ............... | G06F 11/3461 714/37 |
| 6,272,503 B1 * | 8/2001 | Bridge, Jr ........... | G06F 16/9017 |
| 9,094,615 B2 * | 7/2015 | Aman ................. | G06K 9/00711 |
| 9,419,665 B2 * | 8/2016 | Ellis ....................... | G08C 19/00 |
| 2003/0167421 A1 * | 9/2003 | Klemm ................. | G06F 9/3861 714/37 |
| 2005/0020223 A1 * | 1/2005 | Ellis ................... | H04M 1/72442 455/186.1 |
| 2006/0136570 A1 * | 6/2006 | Pandya .................. | H04L 69/16 709/217 |
| 2007/0169179 A1 * | 7/2007 | Narad ................. | G06F 9/30029 726/4 |

(Continued)

OTHER PUBLICATIONS

Ronstrom, M., "On-line Schema Update for a Telecom Database", Data Engineering, IEEE, 16th International Conference, San Diego, Feb. 29-Mar. 3, 2000, 10 pgs.

(Continued)

*Primary Examiner* — Mark E Hershley
(74) *Attorney, Agent, or Firm* — Greenberg Traurig, LLP (57) ABSTRACT

Providing separate real-time and configuration segments in a database. The real-time segment provides real-time data values to a real-time application and the configuration segment provides configuration data values to the real-time application. Utilizing two or more configuration segments enables changes to configuration data values without impacting real-time applications.

19 Claims, 5 Drawing Sheets

(56) References Cited

U.S. PATENT DOCUMENTS

| | | | | |
|---|---|---|---|---|
| 2007/0279494 | A1* | 12/2007 | Aman | H04N 5/332 348/169 |
| 2010/0069035 | A1* | 3/2010 | Johnson | H04L 41/0816 455/404.1 |
| 2012/0173358 | A1* | 7/2012 | Soroca | G06Q 30/08 705/26.3 |
| 2013/0337789 | A1* | 12/2013 | Johnson | H04W 40/244 455/414.1 |
| 2013/0343407 | A1* | 12/2013 | Stroud | H04L 67/10 370/474 |
| 2014/0075004 | A1* | 3/2014 | Van Dusen | H04L 41/04 709/223 |
| 2014/0223029 | A1* | 8/2014 | Bhaskar | H04L 69/04 709/247 |
| 2014/0223030 | A1* | 8/2014 | Bhaskar | H04L 69/04 709/247 |
| 2014/0250227 | A1* | 9/2014 | Slovacek | H04M 3/5191 709/224 |
| 2014/0258645 | A1* | 9/2014 | Dice | G06F 9/467 711/152 |
| 2014/0344266 | A1* | 11/2014 | Bennett | G06F 16/248 707/734 |
| 2015/0067819 | A1* | 3/2015 | Shribman | H04L 65/4084 726/12 |
| 2015/0297949 | A1* | 10/2015 | Aman | G06T 7/246 348/157 |
| 2016/0058933 | A1* | 3/2016 | Ballantyne | A61M 1/1619 210/85 |
| 2016/0086108 | A1* | 3/2016 | Abelow | G06Q 10/10 705/7.29 |
| 2016/0148218 | A1* | 5/2016 | Koch | G06Q 30/0201 705/7.29 |
| 2017/0366637 | A1* | 12/2017 | Bandyopadhyay | H04L 67/1095 |

OTHER PUBLICATIONS

Gary H. Sockut, et al., Online Reorganization of Databases, ACM Computing Surveys, ACM, New York, NY, vol. 41, No. 3, Jul. 30, 2009, (pp. 1-136).

Shivanshu Upadhyay, "SaaS Data Architecture An Oracle White Paper", Oct. 1, 2008, retrieved from Internet, URL:http:www// oracle.com/partners/fr/knowledge-zone/database/saas-data-architecture-whitepaper-302654.pdf; (10 pgs).

Gunnar Mathiason, Segmentation in a Distributed Real-Time Main-Memory Database, Sep. 30, 2002, retrieved from Internet, URL:http// www.diva-portal.org/smash/get/diva2:3140/FULLTEXT02.

Pedro Ramalhete et al., "Brief Announcement: Left-Right—A Concurrency Control Technique with Wait-Free Population Oblivious Reads", vol. LNCS 9363, LNCS, Feb. 10, 2015, 11 pages.

Wikipedia, "Extract, transform, load", retrieved from the Internet: URL: https://en.wikipedia.org/w/index.php?title=Extract,_transform,_load&oldid=659213002, Apr. 25, 2015, 9 pages.

Anonymous, "Stuff Gil Says: WriterReaderPhaser. A story about a new (?) synchronization primitive", retrieved from the Internet: URL: http://stuff-gil-says.blogspot.de/2014/11/writerreaderphaser-story-about-new.html, Nov. 16, 2014, 15 pages.

Anonymous, "Concurrency Freaks: Double Instance Locking", retrieved from the Internet: URL: http://concurrencyfreaks.blogspot.de/2013/11/double-instance-locking.html, Nov. 22, 2013, 4 pages.

* cited by examiner

TRANSACTIONAL INTEGRITY IN A SEGMENTED DATABASE ARCHITECTURE

CROSS-REFERENCE TO RELATED APPLICATIONS

This application is a continuation of U.S. application Ser. No. 15/194,038, filed Jun. 27, 2016, entitled "TRANSACTIONAL INTEGRITY IN A SEGMENTED DATABASE ARCHITECTURE", all of which is hereby incorporated by reference for all purposes.

TECHNICAL FIELD

Aspects of the present disclosure generally relate to database architectures that store data values representing aspects of components in industrial processes. More particularly, aspects relate to systems and methods for storing real-time data values and configuration data values.

BACKGROUND

Conventional systems and methods store real-time data values and configuration data values in a single record structure. Combining these values in a single record structure leads to unnecessary integrity updates of configuration data because version information cannot be compared and the entire record structure must be updated (e.g., after a network connection interruption) even if no data within the record structure changed during the interruption. Combining these values in a single record structure also requires implementation of versioning outside of a real-time database because the record structure, which is the lowest unit of locking granularity, contains both real-time data values and configuration data values. Moreover, the lack of separation between real-time data values and configuration data values leads to the two types of data being bound to the same performance criteria. For example, a time-intensive configuration change that modifies an index, which may not be a critical operation, is given the same level of importance as critical operations such as operator commands and real-time data updates.

SUMMARY

Aspects of the disclosure provide a database architecture segmented into separate real-time and configuration segments to ensure transactional integrity of configuration data values comprising a data record. Aspects of the disclosure additionally or alternatively provide a logical transactional unit for changes to configuration data values.

In an aspect, a system includes a real-time database segment and an operational configuration database segment that are separate from each other. The real-time database segment includes real-time fields adapted to store real-time data values representing a current state of a process device within a continuous process. The real-time fields are adapted to have the real-time data values read from them by a real-time application executing on a computing device. The operational configuration database segment includes operational configuration fields adapted to store configuration data values representing characteristics of the process device. The real-time database segment is a shared memory referenced by the operational configuration database segment. The operational configuration fields are adapted to have the configuration data values read from them by the real-time application during an operational state of the operational configuration database segment.

In another aspect, a method includes a first database segment providing real-time data values representing a current state of a process device within a continuous process to a real-time application executing on a computing device. The real-time data values comprise real-time fields of the first database segment. A second database segment separate from the first database segment provides a first set of configuration data values representing characteristics of the process device to the real-time application during an operational state of the second database segment. The first set of configuration data values comprises configuration fields of the second database segment.

In yet another aspect, a system includes an operational configuration segment of a database and an edit configuration segment of the database. The operational configuration segment includes fields of configuration data adapted to have data values read from them by a real-time application during an operational state of the operational configuration segment. The configuration data represents characteristics of a process device within a continuous process. The edit configuration segment includes fields of configuration data adapted to have data values written to them by an editor during an edit state of the edit configuration segment. The operational state of the operational configuration segment is concurrent with the edit state of the edit configuration segment.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
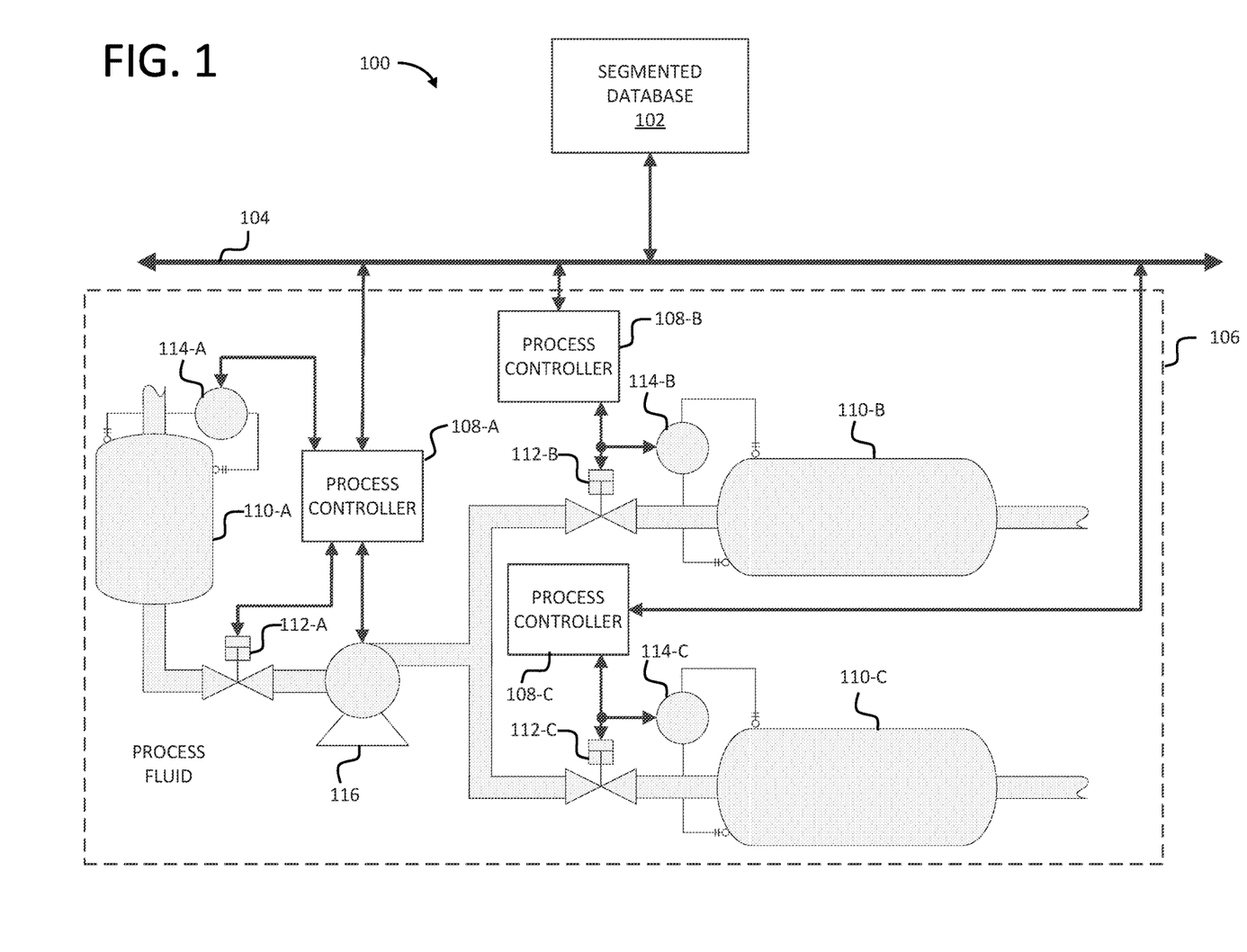
FIG. 1 illustrates an exemplary industrial process system within which aspects of the disclosure may be incorporated.

FIG. 1 illustrates an exemplary system, generally indicated at 100, within which an embodiment of the disclosure may be incorporated. The system 100 includes a segmented database 102, a communications infrastructure 104, and an exemplary plant, such as a fluid processing system 106. As illustrated, the fluid processing system 106 includes process controllers 108, tanks 110, valves 112, sensors 114, and a pump 116. In an embodiment, the segmented database 102, the communications infrastructure 104, the process controllers 108, and the sensors 114 comprise a supervisory control and data acquisition (SCADA) system. In system 100, segmented database 102, process controllers 108, the tanks 112, the valves 114, sensors 116, and the pump 118 are communicatively coupled via communications infrastructure 104.

The segmented database 102 is adapted to provide configuration data values and real-time data values to executing applications that control and/or monitor aspects of fluid processing system 106. In an embodiment, segmented database 102 comprises memory structures on one or more server computing devices. Additional aspects of segmented database 102 are described herein.

The communications infrastructure 104 is capable of facilitating the exchange of data among various components of system 100, including segmented database 102 and components of fluid processing system 106 (e.g., process controllers 108, valves 112, sensors 114, etc.). The communications infrastructure 104 in the embodiment of FIG. 1 includes a local area network (LAN) that is connectable to other telecommunications networks, including other LANs or portions of the Internet or an intranet. The communications infrastructure 104 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 104 is any medium that allows data to be physically transferred through serial or parallel communication channels (e.g., copper wire, optical fiber, computer bus, wireless communication channel, etc.). In an embodiment, communications infrastructure 104 comprises at least in part a process control network. In another embodiment, communications infrastructure 104 comprises at least in part a SCADA system.

Still referring to FIG. 1, the fluid processing system 106 is adapted for changing or refining raw materials to create end products. It will be apparent to one skilled in the art that aspects of the present disclosure are capable of optimizing processes and processing systems other than fluid processing system 106 and that system 106 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, oil and gas pipelines, and/or processes or operations that cannot be interrupted. In an embodiment, process controllers 108 provide an interface or gateway between components of fluid processing system 106 (e.g., valves 112, sensors 114, pump 116) and other components of system 100 (e.g., segmented database 102). In another embodiment, components of fluid processing system 106 communicate directly with segmented database 102 via communications infrastructure 104. In yet another embodiment, process controllers 108 transmit data to and receive data from segmented database 102, valves 112, sensors 114, and/or pump 116 for controlling and/or monitoring various aspects of fluid processing system 106.

The process controllers 108 of FIG. 1 are adapted to control and/or monitor aspects of fluid processing system 106. In an embodiment, processor controllers 108 are programmable logic controllers (PLC) that control and collect data from aspects of fluid processing system 106. In another embodiment, process controllers 108 are adapted to execute real-time applications that receive configuration data values and real-time data values from segmented database 102, as further described herein.

Figure 2:
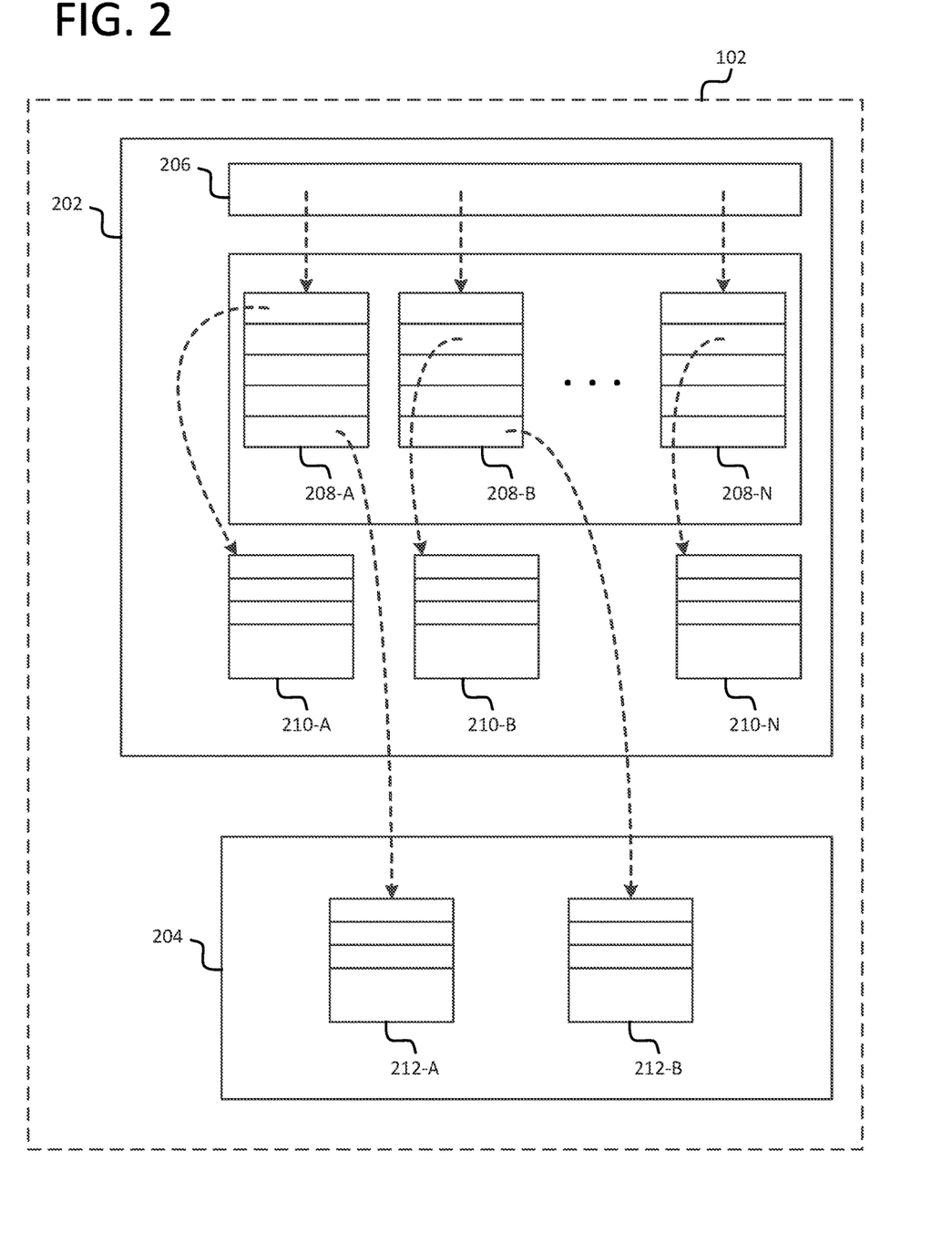
FIG. 2 illustrates an exemplary architecture of database segments according to an embodiment.

FIG. 2 illustrates an exemplary architecture of database segments in accordance with an embodiment of segmented database 102. The exemplary architecture includes a configuration segment 202 and a real-time segment 204. The configuration segment 202 includes key hashtables 206, record headers 208, and configuration data fields 210. The real-time segment 204 includes real-time data fields 212. In an embodiment, real-time segment 204 includes indexes, headers, and the like. In accordance with an aspect of the disclosure, storing configuration data values in configuration segment 202 and storing real-time data values in real-time segment 204 enables each type of data to be treated uniquely.

The configuration segment 202 is adapted to receive, store, and/or provide configuration data values representative of characteristics of components of fluid processing system 106 (e.g., valves 112, pump 116, etc.), such as a name, a description, and the like. In an embodiment, configuration segment 202 contains a portion of a combined data record. The key hashtables 206 are adapted to use a hash function to compute an index into at least one of an array of record headers 208. In an embodiment, a record header 208 exists for each data record. For example, record header 208-A may correspond to valve 112-A and record header 208-B may correspond to valve 112-B. Each record header 208 includes an offset that points to (i.e., pointers) configuration data fields 210 and/or record headers of real-time data fields 212. The configuration data fields 210 are adapted to store the configuration data values. In an embodiment, a group of one or more configuration data fields 210 comprise a field block. In another embodiment, locking is implemented, along with field type information, within configuration segment 202. For example, configuration data fields 210 change when a configuration switch occurs, as further described herein. In accordance with aspects of the disclosure, a transaction log of changes to configuration segment 202 is maintained.

The real-time segment 204 is adapted to receive, store, and/or provide real-time (e.g., current) data values representative of a state and/or property of aspects of fluid processing system 106. An exemplary real-time data value includes, but is not limited to, a flow rate of pump 116. In an embodiment, real-time segment 204 contains a portion of a combined data record. The real-time data fields 212 are adapted to store the real-time data values. In an embodiment, a group of one or more real-time data fields 212 comprise a field block. In accordance with an aspect of the disclosure, only one real-time data field 212 represents the current state of a field device (e.g., valves 112, pump 116, etc.). In one form, real-time data fields 212 are expected to change frequently and are associated with a real-time record lock. Co-pending, co-owned U.S. patent application Ser. No. 15/193,877, entitled Double-Buffered Locking in a Database Architecture, filed on the same day as this application, discloses real-time record locking and is incorporated herein in its entirety by reference.

Figure 3:
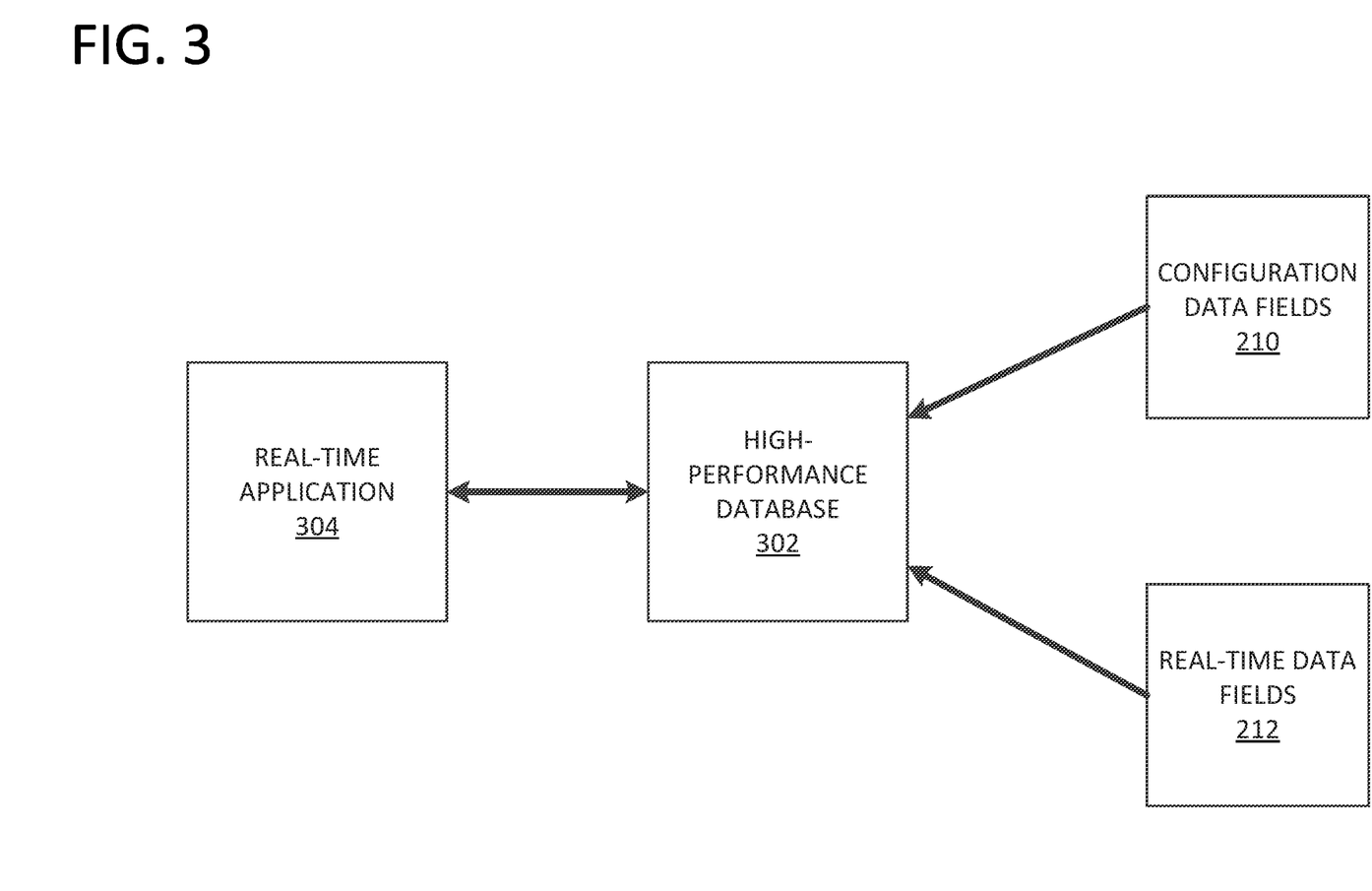
FIG. 3 illustrates an exemplary function block diagram of database segments according to an embodiment.

FIG. 3 illustrates an exemplary function block diagram of database segments of segmented database 102. The illustrated embodiment includes a high-performance database (HPDB) 302, a real-time application 304, configuration data fields 210, and real-time data fields 212. In an embodiment, the HPDB 302 joins configuration data fields 210 and real-time data fields 212 together into a single atomic record structure. Beneficially, combining the data fields of configuration segment 202 and real-time segment 204 into a single atomic record structure hides the underlying segment and offset details to the real-time application. Moreover, combining the data fields into a single atomic record structure removes the need to take the segmented database architecture into consideration when programming real-time application 304 because the field reads look and feel the same to the application 304 even though they are coming from different locations (e.g., configuration data fields 210 from configuration segment 202 and real-time data fields 212 from real-time segment 204).

Referring further to FIG. 3, HPDB 302 provides an application programming interface (API) that enables real-time application 304 to access configuration data fields 210 and real-time data fields 212, in accordance with an embodiment of the disclosure. In this manner, an API provided by HPDB 302 hides the complexity of having two separate shared memory segments (e.g., configuration segment 202 and real-time segment 204) and allows real-time application 304 to utilize a unified view of the data (e.g., configuration data fields 210 and real-time data fields 212). In accordance with an aspect of the disclosure, HPDB 302 performs the required work and reduces complexity of real-time application 304. For example, HPDB 302 may lock the entire configuration segment 202, read configuration data values in configuration data fields 210 and provide the configuration data values to real-time application 304 as required, read real-time data values from real-time data fields 212 and write real-time data values to real-time data fields 212 as required, and unlock configuration segment 202. In accordance with another aspect of the disclosure, HPDB 302 removes the need for real-time application 304 to cache anything and thus reduces the per process cache cost.

Aspects of the disclosure also enable segmented database 102, real-time application 304 (e.g., a real-time database API), and replication facilities to overcome mixed-model issues. For example, real-time application 304 can specify whether a configuration read lock, a configuration write lock, and/or a real-time write lock is requested. In an embodiment, a trigger requires a programmer to specify which locks are requested at each level (e.g., configuration segment 202 and real-time segment 204). Aspects of the disclosure also work with configuration segment 202 that does not include any pointers to real-time segment 204 (e.g., pure configuration) and real-time segment 204 without configuration segment 202 (e.g., pure real-time).

Figure 4:
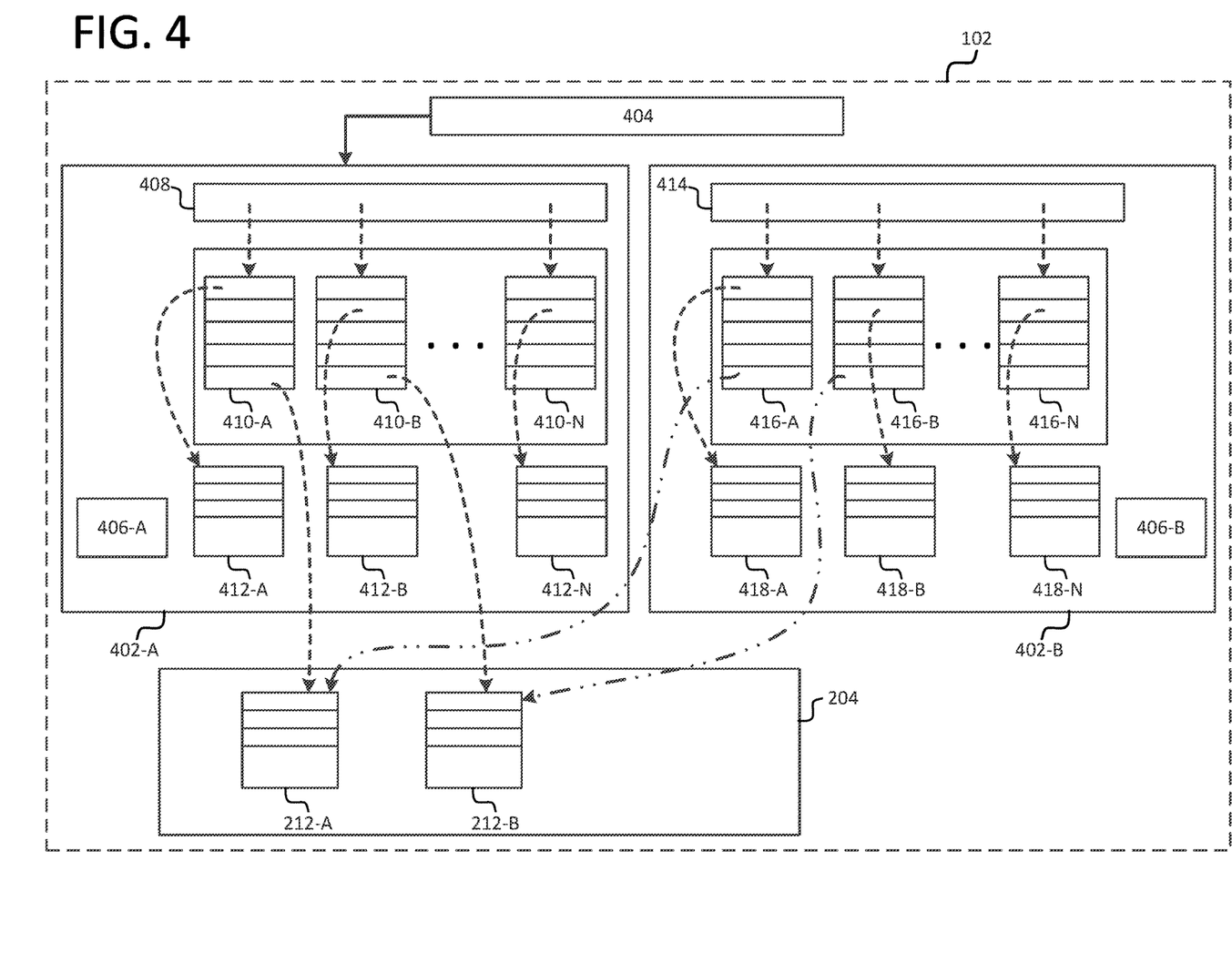
FIG. 4 illustrates an exemplary architecture of operational and edit configuration database segments and a real-time database segment according to an embodiment.

FIG. 4 illustrates an exemplary architecture of two configuration database segments and a real-time database segment of segmented database 102. In accordance with an aspect of the disclosure, utilizing two configuration database segments (e.g., configuration shared memory segments) improves configuration versioning and eliminates conflict between reader threads and a writer thread (e.g., provides transactional integrity). The exemplary architecture includes a first configuration database segment 402-A, a second configuration database segment 402-B, a header block 404, and real-time database segment 204. The first configuration database segment 402-A includes a first counter 406-A, first key hashtables 408, first record headers 410, and first configuration data fields 412. The second configuration database segment 402-B includes a second counter 406-B, second key hashtables 414, second record headers 416, and second configuration data fields 418. As described herein, real-time database segment 204 includes real-time data fields 212. In accordance with another aspect of the disclosure, by utilizing two configuration database segments, configuration changes made to second configuration database segment 402-B do not impact real-time application 304 utilizing data values of first configuration database segment 402-A.

The first configuration database segment 402-A and second configuration database segment 402-B are each adapted to receive, store, and/or provide configuration data values representative of characteristics of components of fluid processing system 106 (e.g., valves 112, pump 116, etc.), such as a name, a description, and the like. In an embodiment, first configuration database segment 402-A receives and/or stores configuration data values during an edit state while second configuration database segment 402-B provides configuration data values during an operational state, as further described herein. In another embodiment, second configuration database segment 402-B in the operational state and real-time database segment 204 each contain a portion of a combined data record. In accordance with an aspect of the disclosure, first configuration database segment 402-A may be referred to as an edit and/or active configuration database segment and second configuration database segment 402-B may be referred to as an operational and/or inactive configuration database segment. In accordance with another aspect of the disclosure, a transaction log of changes to first configuration database segment 402-A and second configuration database segment 402-B is maintained.

The header block 404 is adapted to indicate which of first configuration database segment 402-A and second configuration database segment 402-B is in the operational state (i.e., active). In the embodiment illustrated in FIG. 4, header block 404 points to first configuration database segment 402-A because it is in the operational state. The first counter 406-A and the second counter 406-B are each adapted to indicate how many reader threads are in first configuration database segment 402-A and second configuration database segment 402-B, respectively. For instance, when a reader thread enters first configuration database segment 402-A, which is in the operational state in this exemplary embodiment, the reader thread increments first counter 406-A. The reader thread will then decrement first counter 406-A after it has finished the reading operation and is exiting first configuration database segment 402-A.

The first key hashtables 408 and the second key hashtables 414 are each adapted to use a hash function to compute an index into at least one of an array of first record headers 410 and second record headers 416, respectively. In an embodiment, a first record header 410 and a second record header 416 exists for each data record. For example, first record header 410-A and second record header 416-A may correspond to valve 112-A and first record header 410-B and second record header 416-B may correspond to valve 112-B. Each first record header 410 includes an offset that points to first configuration data fields 412 and/or real-time data fields 212. Each second record header 416 includes an offset that points to second configuration data fields 418 and/or real-time data fields 212. In an embodiment, only one of first record header 410 and second record header 416 includes an active pointer to real-time data fields 212. In the exemplary embodiment illustrated by FIG. 4, the pointers in first record headers 410-A and 410-B are in the operational state, as indicated by the dashed line, while the pointers in second record headers 416-A and 416-B are in the edit state, as indicated by the dot-dot-dash line. In another exemplary embodiment, the pointers in first record header 410-A and second record header 416-B are in the operational state while the pointers in first record header 410-B and second record header 416-A are in the edit state.

The first configuration data fields 412 and second configuration data fields 418 are each adapted to store configuration data values, as further described herein. In an embodiment, a group of one or more first configuration data fields 412 and a group of one or more second configuration data fields 418 each comprise a field block.

Figure 5:
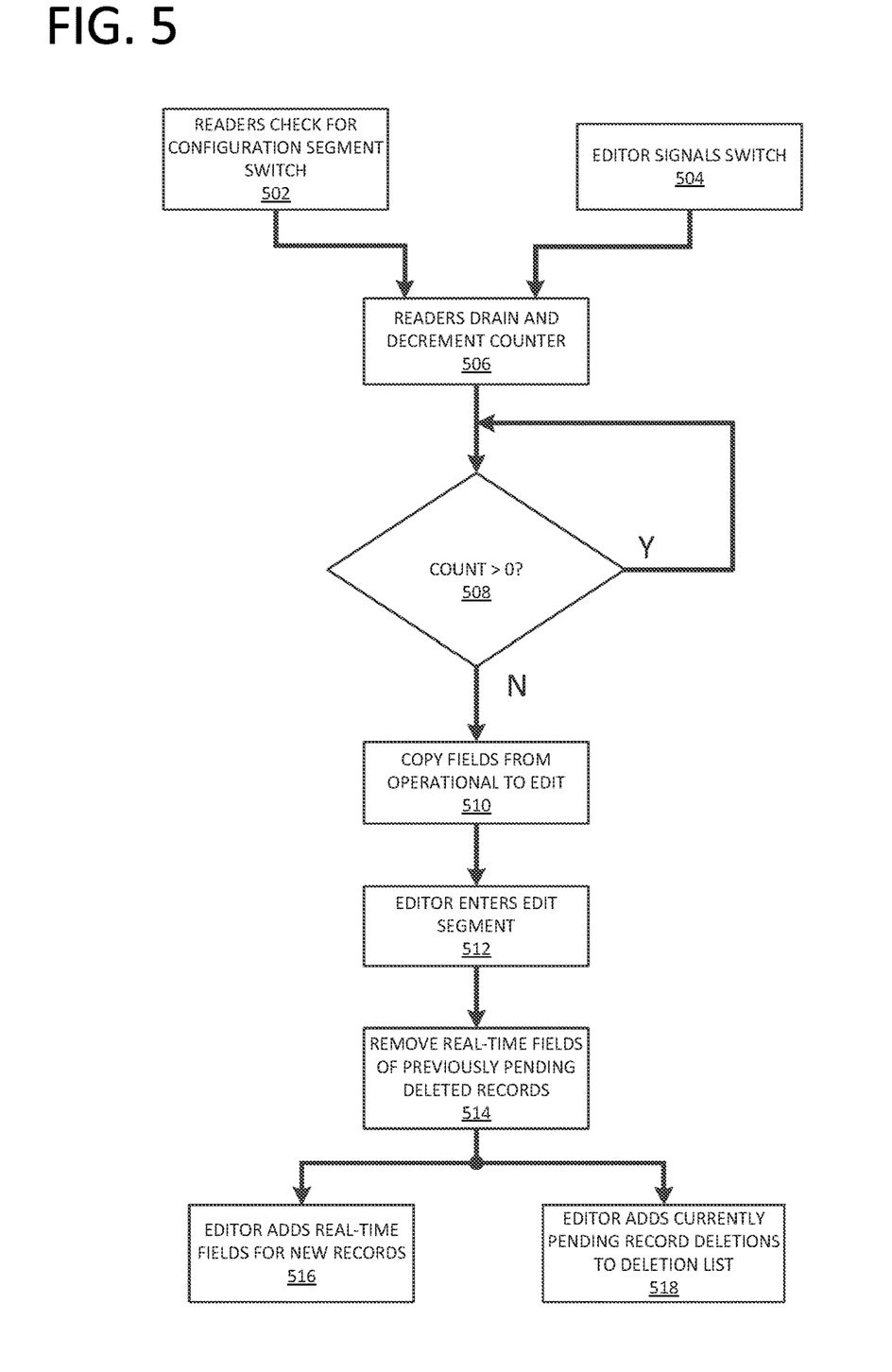
FIG. 5 illustrates an exemplary operation of the exemplary configuration database segments of FIG. 4.

FIG. 5 illustrates an exemplary operation of a configuration database segment (e.g., first configuration database segment 402-A, second configuration database segment 402-B) in accordance with an aspect of the disclosure. At step 502, reader threads within first configuration database segment 402-A in the operational state check to determine whether first configuration database segment 402-A is still in the operational state or if a configuration segment switch has been initiated. In an embodiment, step 502 comprises reader threads checking the value of header block 404 to determine if it still points to first configuration database segment 402-A. At step 504, an editor (e.g., a writer thread) in second configuration database segment 402-B in the edit state overtly signals for a configuration segment switch. In an embodiment, step 504 comprises the editor changing the value of header block 404 to point to second configuration database segment 402-B. The configuration switch will result in first configuration database segment 402-A entering the edit state and second configuration database segment 402-B entering the operational state in the exemplary embodiment.

Upon the reader threads noticing the configuration segment switch (e.g., step 502), they switch from first configuration database segment 402-A to second configuration database segment 402-B at step 506. The reader threads make this switch at their own speed. For example, when a reader thread notices the switch while in the middle of a read operation, the reader thread is able to finish the read operation before switching to the other configuration database segment. In an embodiment, step 506 is referred to as the reader threads draining from first configuration database segment 402-A. During step 506, the reader threads also decrement first counter 406-A to indicate they have exited first configuration database segment 402-A. The reader threads will increment second counter 406-B when they enter second configuration database segment 402-B.

At step 508, the editor determines whether first counter 406-A is greater than zero. When counter 406-A is greater than zero it indicates there is still at least one reader in first configuration database segment 402-A and the editor must wait to enter. When counter 406-A is zero it indicates that all of the readers have drained from first configuration database segment 402-A. At step 510, the values in second record headers 416 and second configuration data fields 418 are copied from second configuration database segment 402-B to first record headers 410 and first configuration data fields 412 of first configuration database segment 402-A. After the values are copied, the editor enters first configuration database segment 402-A at step 512. For sake of brevity, the exemplary operation described above included first configuration database segment 402-A switching from the operational state to the edit state and second configuration database segment 402-B switching from the edit state to the operation state, but one having ordinary skill in the art will understand that the operation may be reversed. At step 514, the editor deletes real-time data fields 212 for records deleted as part of the configuration segment switch, as further described below.

When the editor enters first configuration database segment 402-A in the edit state to add new records it adds the associated real-time data fields 212 into real-time segment 204 at step 516. This addition of real-time data fields 212 does not negatively impact reader threads using second configuration database segment 402-B in the operational state because no second record headers 416 of second configuration database segment 402-B point to the newly added real-time data fields 212.

When the editor enters first configuration database segment 402-A in the edit state to delete existing records it does not immediately remove the associated real-time data fields 212 from real-time segment 204. Removing real-time data fields 212 would impact reader threads currently using second configuration database segment 402-B in the operational state because at least some of second record headers 416 point to the real-time fields 212 that the editor seeks to remove. At step 518, the currently pending records that are to be deleted after the next configuration segment switch are added to a deletion list. For example, the deletion list may be a queue stored on a memory storage device.

The records on the deletion list are cleaned up after the next configuration segment switch has been fully completed and all reader threads moved over to the updated configuration segment. In the exemplary operation illustrated in FIG. 5, in which first database segment 402-A was initially in the operational state and second database segment 402-B was initially in the edit state and then a configuration segment switch occurs, real-time fields 212 associated with record deletions added to the deletion list by an editor in second database segment 402-B in the edit state (e.g., previously pending deleted records) are removed at step 514. The removal of real-time fields 212 may be done at any time after a configuration switch has been completed and all of the reader threads have drained. In an embodiment, real-time fields 212 are removed substantially immediately after the editor enters the edit segment at step 512. In another embodiment, real-time fields 212 are removed periodically (e.g., lazy deletion).

In an embodiment, an additional transaction log of configuration changes is maintained for application on top of and/or in addition to aspects of the disclosure described herein.

Embodiments of the present disclosure may comprise a special purpose computer including a variety of computer hardware, as described in greater detail below.

Embodiments within the scope of the present disclosure also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the disclosure may be implemented. Although not required, aspects of the disclosure will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the disclosure may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the disclosure includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as video adapter 48. In addition to the monitor, personal computers typically include other peripheral output devices (not shown), such as speakers and printers.

One or more aspects of the disclosure may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of aspects of the disclosure.

Embodiments may be implemented with computer-executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A segmented database system comprising:
    at least one computer comprising a processor, a non-transitory computer readable medium, the non-transitory computer readable medium comprising processor executable code, the processor executable code comprising:
    a configuration segment;
    a record header;
    a configuration data field;
    a real-time segment; and
    a real-time data field;
    wherein the real-time segment and the configuration segment are separate memory segments;
    wherein the configuration segment comprises the record header and the configuration data field;
    wherein the configuration segment is configured and arranged to receive, store, and/or provide configuration data values;
    wherein the configuration data field is configured and arranged to store the configuration data values;
    wherein the real-time segment comprises the real-time data field;
    wherein the real-time data field is configured and arranged to store real-time data values;
    wherein the record header is configured to point to both the configuration data field and the real-time data field;
    wherein the configuration segment comprises key hashtables;
    wherein the record header is an array of record headers; and
    wherein the key hashtables are configured and arranged to use a hash function to compute an index into at least one of the array of record headers.

2. The segmented database system of claim 1,
    wherein the processor executable code further comprises a performance database; and
    wherein the performance database joins the configuration data field and the real-time data field together into a single atomic record.

3. The segmented database system of claim 2,
    wherein the performance database is configured and arranged to perform one or more of:
    locking the configuration segment;
    reading configuration data values in configuration data fields;
    providing the configuration data values to a real-time application;
    reading real-time data values from real-time data fields;
    writing real-time data values to real-time data fields; and
    unlocking the configuration segment.

4. The segmented database system of claim 2,
    wherein the single atomic record is configured and arranged to hide separate shared memory segments from a real-time application.

5. The segmented database system of claim 4,
    wherein the performance database is configured and arranged to remove a need for the real-time application to cache anything.

6. The segmented database system of claim 2,
    wherein at least one of the configuration data field and real-time data field are configured and arranged to interface with a real-time application;
    wherein the record header comprises offsets that point to the configuration data field and the real-time data field; and
    wherein joining the configuration data field and the real-time data field together into a single atomic record hides segment and offset details from the real-time application.

7. A segmented database system comprising:
    at least one computer comprising a processor and a non-transitory computer readable medium, the non-transitory computer readable medium comprising processor executable code, the processor executable code comprising instructions for generating:
    a first configuration segment and a second configuration segment;
    a first record header and a second record header;
    a first configuration data field and second configuration data field;
    a real-time segment; and
    a real-time data field;

wherein the real-time segment, the first configuration segment, and the second configuration segment are each separate memory segments;

wherein the first configuration segment comprises the first record header and the first configuration data field, and the second configuration segment comprises the second record header and the second configuration data field;

wherein the real-time segment comprises the real-time data field;

wherein the first record header is configured to point to both the first configuration data field and the real-time data field;

wherein the first configuration segment comprises a first key hashtable and the second configuration segment comprises a second key hashtable;

wherein the first record header is a first array of record headers, and second record header is a second array of record headers; and wherein the first key hashtable and the second key hashtable are each configured and arranged to use a hash function to compute an index into at least one of the first array of record headers and the second array of record headers, respectively.

8. The segmented database system of claim 7, wherein each of the first and second configuration segments are configured and arranged to receive, store, and/or provide configuration data values representative of characteristics of one or more aspects of a process; and wherein the real-time data segment is configured and arranged to receive, store, and/or provide real-time data values representative of a state and/or property of one or more aspects of the process.

9. The segmented database system of claim 7, the processor executable code further comprising instructions for generating a switching operation;

wherein the switching operation comprises copying data from the first configuration segment to the second configuration segment; and wherein the second configuration record header points to the second configuration data field and the real-time data field after the switching operation.

10. The segmented database system of claim 7, the processor executable code further comprising instructions for generating a header block;

wherein one of the first configuration segment and second configuration segment is an active segment, and an other of the first configuration segment and second configuration segment is an inactive segment; and wherein the header block is configured and arranged to indicate which of the first and second configuration segments is an active segment.

11. The segmented database system of claim 10, the processor executable code further comprising instructions for generating a reader thread, a writer thread, and a switching operation;

wherein the first and second configuration segments are configured and arranged to have the reader thread and the writer thread enter thereto;

wherein the switching operation comprises the header block switching indication of which of the first and second configuration segments is the active segment;

wherein the switching operation comprises copying data from the first configuration segment to the second configuration segment; and wherein the second record header points to both the second configuration data field and the real-time data field after the switching operation.

12. The segmented database system of claim 11, wherein the reader thread is one or more reader threads; and wherein the active segment is configured and arranged to be read by the one or more reader threads while the inactive segment is being edited by the writer thread.

13. The segmented database system of claim 11, wherein the header block is configured and arranged to execute the switching operation in response to a request by the writer thread.

14. A segmented database system comprising:

at least one computer comprising a processor, a non-transitory computer readable medium, the non-transitory computer readable medium comprising processor executable code, the processor executable code comprising instructions for generating:

a first configuration segment and a second configuration segment;

a first record header and a second record header;

a first configuration data field and a second configuration data field;

a real-time segment;

a real-time data field; and a performance database;

wherein the real-time segment, the first configuration segment, and the second configuration segment are each separate memory segments;

wherein the performance database is separate from the real-time segment, the first configuration segment, and the second configuration segment;

wherein the first configuration segment comprises the first record header and the first configuration data field, and the second configuration segment comprises the second record header and the second configuration data field;

wherein the real-time segment comprises the real-time data field;

wherein the first record header is configured to point to both the first configuration data field and the real-time data field;

wherein the performance database joins one or more configuration data fields and real-time data fields together into a single atomic record;

wherein the first configuration segment comprises a first key hashtable, and the second configuration segment comprises a second key hashtable;

wherein the first record header is a first array of record headers, and second record header is a second array of record headers; and wherein the first key hashtable and the second key hashtable are each configured and arranged to use a hash function to compute an index into at least one of the first array of record headers and the second array of record headers, respectively.

15. The segmented database system of claim 14, wherein utilizing two configuration database segments eliminates conflict between reader threads and a writer thread.

16. The segmented database system of claim 14, wherein at least one of the first and second configuration data fields and real-time data field are configured and arranged to interface with a real-time application;

wherein at least one of the first and second record headers comprises offsets that point to the configuration data fields and the real-time data fields; and wherein joining the configuration data fields and the real-time data fields together into a single atomic record hides segment and offset details from the real-time application.

17. The segmented database system of claim 14,
the processor executable code further comprising instructions for generating a switching operation;
wherein the switching operation comprises copying data from the first configuration segment to the second configuration segment; and
wherein the second configuration record header points to both the second configuration data field and the real-time data field after the switching operation.

18. The segmented database system of claim 14,
the processor executable code further comprising instructions for generating a header block;
wherein one of the first configuration segment and second configuration segment is an active segment, and an other of the first configuration segment and second configuration segment is an inactive segment; and
wherein the header block is configured and arranged to indicate which of the first and second configuration segments is an active segment.

19. The segmented database system of claim 18,
the processor executable code further comprising instructions for generating a reader thread, a writer thread, and a switching operation;
wherein the first and second configuration segments are configured and arranged to have the reader thread and the writer thread enter thereto;
wherein the switching operation comprises the header block switching indication of which of the first and second configuration segments is the active segment;
wherein the switching operation comprises copying data from the first configuration segment to the second configuration segment; and
wherein the second record header points to both the second configuration data field and the real-time data field after the switching operation.

\* \* \* \* \*